United States Patent
Morrison

[11] 3,847,330
[45] Nov. 12, 1974

[54] MOTOR MOUNTING BRACKET

[76] Inventor: Jimmie H. Morrison, 2921 Monitor, Norman, Okla. 73069

[22] Filed: Aug. 15, 1973

[21] Appl. No.: 388,604

[52] U.S. Cl. ............................... 248/14, 417/363
[51] Int. Cl. ............................................. F16f 15/04
[58] Field of Search ............ 24/279, 280, 281, 283; 248/14, 15; 417/363; 98/94; 310/51, 91

[56] References Cited
UNITED STATES PATENTS

| | | | |
|---|---|---|---|
| 470,344 | 3/1892 | Baldwin | 24/283 |
| 2,008,669 | 7/1935 | Hornung | 24/283 |
| 2,939,627 | 6/1960 | Greiner | 417/363 |
| 3,123,288 | 3/1964 | Franklin | 248/15 |
| 3,414,950 | 12/1968 | Phariss | 24/280 |
| 3,773,285 | 11/1973 | Morrill | 248/15 |

*Primary Examiner*—Donald A. Griffin
*Attorney, Agent, or Firm*—Dunlap, Laney, Hessin, Dougherty & Codding

[57] ABSTRACT

A motor mounting bracket which includes a plurality of elongated longitudinal wires or rods for extension along the sides of a cylindrical motor housing, and a plurality of annular wires or rods encircling the elongated first mentioned wires and welded or attached thereto for retaining the first mentioned wires against the side of the motor housing. The annular wires are preformed to accommodate the longitudinal elongated first mentioned wires while retaining at least a portion of the total length of the annular wires or rods in position to contact the cylindrical housing of the motor. Mounting rings or loops are formed at one or both ends of a plurality of the elongated longitudinally extending first mentioned wires to facilitate the mounting of a motor held in the mounting holder and bracket of the invention against another structure, such as the housing of a squirrel cage blower driven by the motor. The annular wires or rods carry, at a pair of opposed ends thereof, brackets having aligned apertures therethrough to permit a tensioning bolt to be passed through the apertures to tension the annular wires.

10 Claims, 3 Drawing Figures

PATENTED NOV 12 1974  3,847,330

MOTOR MOUNTING BRACKET

BACKGROUND OF THE INVENTION

1. Field of the Invention

This invention relates to holders or brackets employed for the purpose of holding and mounting motors having a cylindrical housing against a structure having a flat surface, such as a blower housing.

2. Brief Description of the Prior Art

It has heretofore been a conventional practice in electrical technology to employ a motor mounting bracket which includes a plurality of interconnected rods for the purpose of mounting relatively large, heavy motors against flat surfaces. The types of brackets used for this mounting function have frequently included a plurality of relatively straight bars or rods which extend substantially parallel to the axis through the cylindrical motor housing, with these rods each having a loop or ring formed at at least one end thereof to receive mounting bolts. The several rings are positioned in coplanar alignment for flatly abutting the surface upon which the bracket and the motor carried thereby are to be mounted. The brackets have further usually included a plurality of annular bands or rods which extend around the casing or housing of the motor in contact therewith. These bands or rods are disposed inside the straight, longitudinally extending rods and are welded thereto, so that securement of the straight rods by bolts passed through the coplanar rings in the manner described also has the effect of securing the annular bands and the motor mounted within these bands. The bands can be drawn tightly about the housing of the motor by means of a pair of angle tensioning plates secured to opposed ends of the annular bands, with the angle plates having protuberant apertured flanges which can receive a bolt or other tensioning member through aligned apertures to permit the bands to be placed in tension around the motor housing.

In the construction of motor mounting or supporting brackets of the type described, the straight rods which extend to the outside of the annular bands in the bracket have been welded to the annular bands by welds which require insetting of the straight rods into the annular bands to a substantial depth in order to provide welds of sufficient strength to withstand the acting vibratory forces and stresses without failing. Despite this arrangement, failure of the welds between the straight, longitudinally extending rods and the annular bands is a frequently experienced malfunction of motor mounting brackets of the type described, and can frequently lead to sagging of the motor, or its complete collapse from the position of support. Even the slightest sagging of the motor can, on occasion, result in misalignment of the output shaft from the motor with a driven member in a kinematic chain receiving power from the motor, resulting in excessive wear or destruction of bearings.

BRIEF DESCRIPTION OF THE PRESENT INVENTION

The present invention provides an improvement in motor mounting holders and brackets, which improvement facilitates a longer service life of the bracket without the occurrence of the described malfunction of failure of welds due to vibration and stress imposed on the bracket. Broadly described, the motor mounting holder and bracket of the invention comprises a plurality of straight, elongated wires or rods extending substantially parallel to each other, and on substantially equal spacing around an imaginary circle. Each of the straight rods has formed at one end thereof, a ring or loop, and the rings formed on ends of the several rods lie in a common plane which extends substantially normal to the axes of the several rods. The rings thus provided on the rods facilitate the bolting of the bracket to a flat surface, such as on the side of the housing of a squirrel cage blower to permit the motor to be located adjacent the blower to provide the driving power therefor.

Extending around the straight, longitudinally extending rods are a plurality of annular bands which receive the rods on the inner side thereof in a position to force the rods against the side of the cylindrical housing of a motor to be mounted in the bracket at a time when the bands are placed in tension, and their effective diameter thus reduced. The bands extend in substantially parallel planes and preferably carry at adjacent ends thereof (the bands are not continuous), means for tensioning and constricting the bands to reduce their effective diameter. In this way, the straight longitudinally extending rods can be forced into abutting contact with the cylindrical motor housing.

With the described construction, the welds between the annular bands and the straight longitudinally extending rods need not be as heavy and strong, as in prior bracket constructions, nor need the inset of the rods in the bands be significant, as has been characteristic of prior constructions. The positioning of the straight, longitudinally extending rods in contact with the housing and inside the annular bands more effectively dampens the vibrations transmitted through the rods to the annular bands, and also permits the straight longitudinally extending rods to continue to function even though a break may occur at some point over the length thereof, or a weld joint may fail.

An object of the present invention is to provide a motor mounting holder and bracket which is of sturdy construction, and is characterized by a significantly longer and more trouble-free operating life than has been characteristic of similar brackets previously in use.

A further object of the invention is to provide a motor mounting holder and bracket which is simple to fabricate and use, and which has great structural strength for holding heavy motors in a cantilevered fashion over extended periods of time.

Additional objects and advantages of the invention will become apparent as the following detailed description of the invention is read in conjunction with the accompanying drawings which illustrate the invention.

DETAILED DESCRIPTION OF A PREFERRED EMBODIMENT OF THE INVENTION

Figure 1:
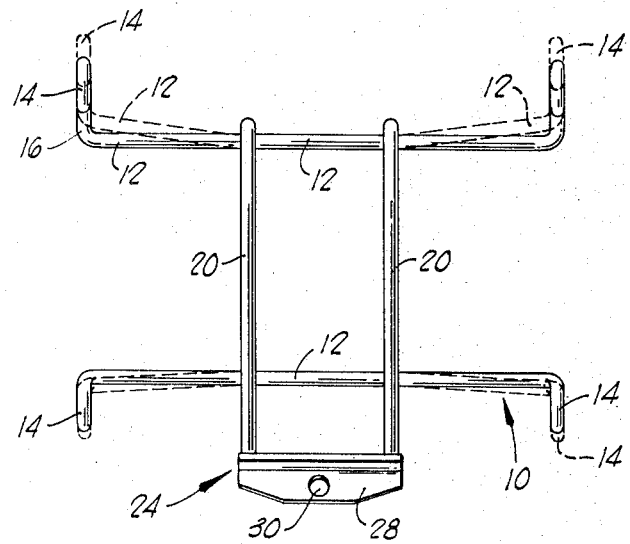
FIG. 1 is a side elevation view of the motor mounting housing and bracket constructed in accordance with the invention.
Figure 2:
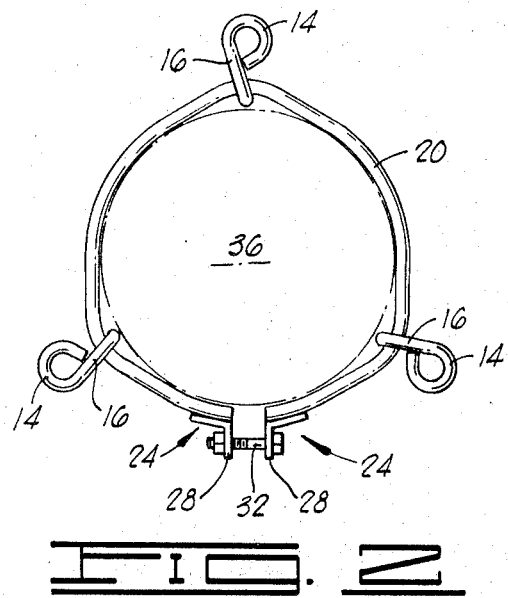
FIG. 2 is a plan view of the motor mounting housing and bracket shown in FIG. 1.

Referring to the drawings, the bracket of the invention is designated generally by reference numeral 10 and includes, in the illustrated embodiment, three relatively straight, elongated, longitudinally extending wires or rods 12. The rods 12 are preferably equally spaced around the circumference of an imaginary circle (that is, on spacings of 120°). The rods 12 may, instead of being made precisely straight over their length, be characterized in having an angulation formed on each side of a central portion, with the end portions of each rod extending at an angle of about 20° to such central portion, and in substantially the same direction with respect thereto. This optional configuration of the rods is illustrated in dashed lines in FIG. 1.

At each end of each of the rods 12, the end portion of the rod is bent through a right angle, and is then turned through a circle to form a ring 14 carried by a foot portion 16 formed at the end of each of the rods. Such rings 14 and foot portions 16 are, in the illustrated embodiment, formed at each of the two ends of each rod 12, and it will be perceived that the several rings at one of the ends of the several rods lie in a common plane which extends substantially normal to the longitudinal axis of each of the rods.

Extending around and outside of the several rods 12 are a plurality of annular bands 20 which can also be formed of wire or rod and, in the illustrated embodiment, are rods which are of substantially the same diameter as the rods 12. The circles formed by the several annular bands are preferably of substantially the same diameter. The annular bands 20 are secured by welding, brazing of the like to the longitudinally extending rods 12 which are positioned therewithin, and each of the bands 20 is a discontinuous structure — that is, a pair of free ends are provided on each of the bands. In another way of describing the relationship of the rods 12 and bands 20, the bands extend in substantially horizontal planes, and the rods extend substantially normal to the planes of the band. In a preferred embodiment of the invention, the bands 20 are preshaped to provide angulations at the locations of contact with the rods 12. This construction aids in relieving stresses when a motor is positioned within the bracket 10, as hereinafter described, and the bands 20 are placed in tension.

In the illustrated embodiment of the invention, tensioning plates designated generally by reference numeral 24 are secured between the two adjacent bands immediately adjacent the aligned free ends thereof, and include a flange 28 which projects in a plane which includes the central axis of rotation of the bands 20. The flanges 28 on the two tensioning plates 24 thus extend generally parallel to each other, and each of the flanges has formed therethrough, a bolt receiving aperture 30. A tensioning bolt 32, as shown in FIG. 4, can thus be passed through the apertures 30, and a suitable nut utilized to draw the tensioning plates 24 toward each other, and thus constrict the annular bands 20 and reduce the effective diameter of each of these bands.

Figure 3:
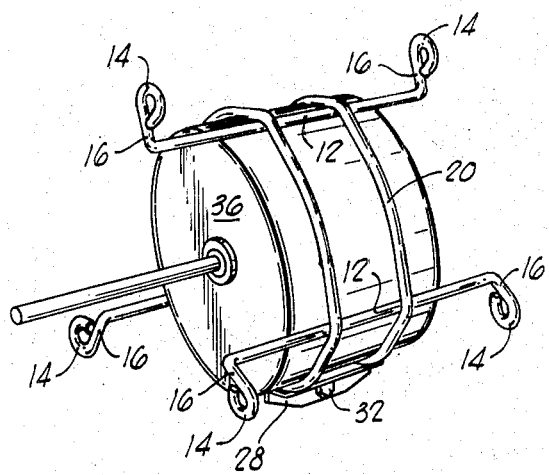
FIG. 3 is a perspective view of the motor mounting housing and bracket as it appears when a motor is mounted therein.

In the use of the motor mounting bracket 10 of the invention, a motor 36, encased within its cylindrical housing, is positioned within the annular bands 20, as shown in FIG. 3. The tensioning bolt 32 is then extended through the apertures in the tensioning plates 24, and the annular bands are then constricted by drawing these plates toward each other by the use of the bolt and a suitable nut. As the annular bands 20 are constricted and their diameter decreased, this forces the elongated straight rods 12 against the sides of the motor housing. In this position, the annular bands 20 always enclose the rods 12 and hold them in position, and if one of the rods should break intermediate its length, the remainder of the bracket remains intact, and the remainder of the rods and annular bands still function to support the motor. Moreover, if a weld between one of the annular bands 20 and one of the rods 12 should fail, the rod is still retained in position against the side of the motor housing by the surrounding annular band and functions to grip and engage the motor and hold it in position.

In that alternate embodiment of the invention which is illustrated in dashed lines in FIG. 1, the rods 12 are angled on opposite sides of a central portion of each rod, so that a minimal amount of each rod is in contact with the motor housing. This functions to minimize the transmission of vibrations and stresses to the rods 12, and to minimize the transmission of the total amount of the vibration being sustained or undergone by one of the rods through the motor housing to the other rods.

Although certain preferred embodiments of the present invention have been herein disclosed in order to provide an understanding of the basic principles which underlie the invention, it will be perceived that various changes and innovations can be effected in the depicted and described structures without departure from the principles of the invention. Changes and innovations of this type are therefore deemed to be circumscribed by the spirit and scope of the invention except as the same may be necessarily limited by the appended claims or reasonable equivalents thereof.

What is claimed is:

1. A motor mounting bracket comprising:
   a plurality of annular bands disposed in substantially parallel planes;
   a plurality of spaced, elongated rods extending substantially normal to said annular bands and each secured intermediate its length to each of said bands at points on the inside of the respective annular band whereby said rods are enclosed within said bands;
   means at one of the ends of each of said rods for securing said bracket to a supporting structure; and means for tensioning and constricting said bands to reduce the effective diameter thereof.

2. A motor mounting bracket as defined in claim 1 wherein said means for securing said brackets to a supporting structure comprises a rigid ring disposed at said one end of each of said rods, and lying in a plane extending substantially parallel to the planes in which said bands lie.

3. A motor mounting bracket as defined in claim 1 wherein said tensioning means comprises:
   a pair of tensioning plates secured to said bands; and means for drawing said tensioning plates toward each other.

4. A motor mounting bracket as defined in claim 1 wherein each of said elongated rods is further characterized in having:
   a central portion extending between points of securement of the respective rod to said annular bands; and end portions connected to said central portion and angled with respect thereto at an acute angle of less than 45°, and angled away from the interior area encompassed within said annular bands.

5. A motor mounting bracket as defined in claim 1 wherein said means for securing said brackets to a supporting structure comprises:
- a foot portion at said one end of each of said rods and extending in a plane which is substantially parallel to the planes occupied by said bands; and
- a bolt-receiving loop formed on each of said foot portions, said foot portions and loops all lying in substantially the same plane.

6. A motor mounting bracket as defined in claim 1 wherein each of said bands is angled through an obtuse angle at its point of securement to each of said rods, with the respective rods being disposed at the vertex of the angle, and the respective band extending from such vertex substantially tangentially with respect to a circle of the least diameter sufficient for the circle to touch each of said rods on the opposite side thereof from its point of securement to said bands.

7. A motor mounting bracket comprising:
- a plurality of elongated rods spaced from each other on substantially equidistant spacings on the periphery of an imaginary circle lying in a plane extending substantially normal to the longitudinal axes of said rods;
- a plurality of spaced bands encircling said rods and each defining obtuse angles equal in number to the number of said rods, each of said rods being positioned in one of said obtuse angles of each of said bands at the vertex of said angle and secured to the respective band at said vertex;
- means for constricting and tightening said bands about said rods to cause said rods to be moved toward the center of said imaginary circle; and
- means for securing ends of the several rods to a supporting structure for supporting said bracket and a motor mounted therein.

8. A motor mounting bracket as defined in claim 7 wherein each of said bands is of fixed length and has a pair of ends at the opposite ends of the respective band; and said means for tensioning said bands comprises:
- a plate carried at each of the ends of each of said bands; and
- means for drawing said plates toward each other to thereby constrict each of said bands.

9. In combination:
- a motor having a cylindrical housing and having an output shaft extending substantially coaxially in said housing and projecting from one end of the housing:
- a bracket surrounding and enclosing said motor, said bracket comprising:
- a plurality of rods spaced substantially equidistally from each other around said motor housing, and each having a central portion contacting said housing and extending substantially parallel to the axis of said cylindrical housing; and
- a plurality of spaced bands encircling said rods to the outer side thereof and tensioned to force said rods into contact with said housing along a central portion of each of said rods; and
- means for securing said rods to a supporting structure whereby said rods, bands and motor can be cantilevered from said supporting structure.

10. The combination defined in claim 9 wherein each of said bands is angled through an obtuse angle at its point of contact with each of said rods, with the respective rod being disposed at the vertex of the angle, and the respective band extending from said vertex substantially tangentially with respect to a circle of the least diameter sufficient for the circle to touch each of said rods on the opposite side thereof from its point of securement to said bands.

* * * * *